US011239690B2

United States Patent
Knoop et al.

(10) Patent No.: US 11,239,690 B2
(45) Date of Patent: Feb. 1, 2022

(54) UNINTERRUPTIBLE POWER SUPPLY

(71) Applicant: Phoenix Contact GmbH & Co. KG, Blomberg (DE)

(72) Inventors: Daniel Knoop, Paderborn (DE); Irene Berthold, Soest (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 211 days.

(21) Appl. No.: 16/606,153

(22) PCT Filed: Apr. 18, 2018

(86) PCT No.: PCT/EP2018/059912
§ 371 (c)(1),
(2) Date: Oct. 17, 2019

(87) PCT Pub. No.: WO2018/192977
PCT Pub. Date: Oct. 25, 2018

(65) Prior Publication Data
US 2021/0119474 A1    Apr. 22, 2021

(30) Foreign Application Priority Data
Apr. 21, 2017   (DE) ..................... 10 2017 108 516.5

(51) Int. Cl.
*H02H 3/00*    (2006.01)
*H02J 9/06*    (2006.01)
(Continued)

(52) U.S. Cl.
CPC ............. *H02J 9/061* (2013.01); *H02H 3/087* (2013.01); *H02H 9/02* (2013.01)

(58) Field of Classification Search
None
See application file for complete search history.

(56) References Cited

U.S. PATENT DOCUMENTS 8,890,373 B2 *  11/2014  Savolainen ............. H02J 9/062
                                                    307/151
9,979,218 B2 *   5/2018  Prakash ................... H02J 9/062
(Continued)

FOREIGN PATENT DOCUMENTS

AT              410867 B    12/2002
AT             504528 A4     6/2008
(Continued)

*Primary Examiner* — Stephen W Jackson
(74) *Attorney, Agent, or Firm* — Holland & Hart LLP

(57) ABSTRACT

The present disclosure relates to an uninterruptable power supply for an electrical consumer. The uninterruptable power supply may include a first current path; a second current path, where the first current path and the second current path are configured to supply electrical energy; a first switch configured to interrupt the first current path; a voltage transformer configured to limit a current intensity of an electrical current, where the voltage transformer is in the second current path; and a controller configured to open the first switch when a current intensity limit value of the electrical current in the first current path is reached to electrically interrupt the first current path and conduct the electrical current over the voltage transformer to limit the current.

18 Claims, 2 Drawing Sheets

(51) Int. Cl.
    *H02H 3/087*     (2006.01)
    *H02H 9/02*     (2006.01)

(56) References Cited

U.S. PATENT DOCUMENTS

2004/0164617 A1    8/2004  Bobb et al.
2015/0069842 A1    3/2015  Niu et al.
2016/0359311 A1   12/2016  Handy et al.

FOREIGN PATENT DOCUMENTS

| DE | 10357250 A1 | 7/2005 |
| DE | 102005027211 A1 | 12/2006 |
| DE | 102012203995 A1 | 9/2012 |
| WO | WO 2006/005175 A1 | 1/2006 |

\* cited by examiner

UNINTERRUPTIBLE POWER SUPPLY

CROSS-REFERENCES TO RELATED APPLICATIONS

This application is a 371 national phase entry of International Patent Application No. PCT/EP2018/059912, entitled "UNINTERRUPTIBLE POWER SUPPLY," filed 18 Apr. 2018, which claims priority to German Patent Application No. 10 2017 108 516.5, entitled "UNTERBRECHUNGSFREIE STROMVERSORGUNG," filed 21 Apr. 2017. Each of these applications is incorporated herein by reference.

TECHNICAL FIELD

The present disclosure relates to an uninterruptible power supply (UPS) for supplying an electrical consumer with electrical energy.

BACKGROUND

In a conventional UPS, the electrical consumer is supplied with electrical energy via a supply network connection, and if the supply network connection fails, the electrical consumer is supplied with electrical energy, for example via an energy storage. It is possible, however, for an electrical current to flow through the electrical consumer, the current intensity of which is greater than a current intensity limit value of the UPS. In such a case, a conventional UPS usually interrupts the supply of electrical energy to the electrical consumer in order to prevent damage to the UPS and/or to the consumer. Such an interruption of the energy supply is not desirable, however.

SUMMARY

The object of the present disclosure is to create an efficient UPS, in which the supply of electrical energy to the consumer is not interrupted.

This object is achieved with the features of the independent claim. Advantageous examples are the subject matter of the dependent claims, the description and the accompanying figures.

The present disclosure is based on the knowledge that the above object can be achieved with a UPS that comprises a voltage transformer via which an electrical consumer connected to the UPS can be supplied with electrical energy, wherein the voltage transformer is configured to modify the electrical voltage made available to the electrical consumer and/or limit the electrical current flowing through the electrical consumer.

According to a first aspect, the disclosure relates to a UPS for an electrical consumer, comprising a first current path and a second current path, which are configured to supply the electrical consumer with electrical energy, a first switch, which is configured to interrupt the first current path, a voltage transformer for limiting a current intensity of an electrical current, wherein the voltage transformer is arranged in the second current path, and a controller, which is configured to open the first switch when a current intensity limit value of the electrical current in the first current path is reached in order to electrically interrupt the first current path and conduct the electrical current over the voltage transformer in order to limit the current.

The electrical consumer connected to the UPS can modify the current intensity of the electrical current flowing through the electrical consumer during operation. The current intensity of the electrical current can in particular be increased by a short circuit in the electrical consumer. A constant electrical voltage at the electrical consumer increases the electrical power supplied to the electrical consumer by the UPS. If the current intensity limit value is exceeded, an electrical energy supply of the consumer can be realised with reduced electrical output by switching from the first current path to the second current path.

The voltage transformer can limit the current flowing through the electrical consumer, but the supply of the electrical consumer with electrical energy is maintained even when the current intensity limit value is exceeded. The voltage transformer can adjust the current intensity of the electrical current, so that the electrical current can flow through the second current path and/or the electrical consumer with a current intensity below the current intensity limit value.

In one example, the first switch is arranged in the first current path.

This achieves the advantage that the first current path can be interrupted by opening the first switch, and an electrical current can flow to the electrical consumer via the voltage transformer in the second current path. In this example, the switch can have an opened and a closed switch position.

The first switch can be connected upstream of the first and second current path and in particular switch between the first and the second current path. The first switch can be configured as a Y selector switch, which can be permanently connected to the energy source, for example, and, in a first switch position, realises an electrical connection between the energy source and the first current path and, in a second switch position, realises an electrical connection between the energy source and the second current path.

In an example, the first current path and the second current path are connected in parallel.

This achieves the advantage that the supply of the electrical consumer with electrical energy can occur either via the first current path and/or via the second current path. The ratio of the current intensity of the electrical current between the first current path and the second current path can be determined via the ratio of the electrical resistance of the first current path to the electrical resistance of the second current path.

In one example, the controller is configured to close the first switch when the current intensity falls below the current intensity limit value, in order to incorporate the first current path in the energy supply.

This achieves the advantage that the second current path, and consequently the voltage transformer, can only participate in the energy supply of an electrical consumer if the current intensity of the electrical current exceeds the current intensity limit value. If the current intensity is below the current intensity limit value, the electrical energy supply can be realised via the first current path.

In one example, the voltage transformer is a direct current (DC) voltage transformer.

The UPS can in particular be configured to supply the electrical consumer with a DC voltage, so that the DC voltage transformer can reduce the current intensity of an electrical direct current.

In one example, the voltage transformer is a step-down converter for voltage reduction.

A step-down converter can reduce an electrical voltage supplied to it to a lower voltage value, whereby the reduced voltage can be made available to the electrical consumer. By reducing the electrical voltage, the electrical current that flows through the electrical consumer can be reduced as well.

In one example, the first switch is electrically arranged in parallel to the voltage transformer.

If the first switch is closed, an electrical current can flow directly, for example from an energy source, to the electrical consumer via the first switch. This achieves the advantage that a supply of the electrical consumer with electrical energy without a limitation of the current intensity of the electrical current flowing to the electrical consumer can take place without further electrical components, in particular without the voltage transformer. As a result, losses in the transmission of electrical energy via the UPS can advantageously be reduced.

If the first switch is open, the voltage transformer, which is electrically arranged in parallel, can have a lower electrical resistance than the open first switch, so that an electrical current can flow, for example from an energy source, to the electrical consumer via the voltage transformer. This achieves the advantage that the electrical current or the electrical voltage, which can be made available to the electrical consumer, can be modified by the voltage transformer. In particular the current intensity of the electrical current can be adjusted.

In one example, the first switch comprises one or a plurality of metal-oxide-semiconductor field-effect transistors (MOSFET) or at least one relay.

The first switch can be formed by a transistor, in particular a MOSFET, which makes a quick and efficient switching operation possible. The first current path can be electrically separated with the transistor without causing a physical separation of the first current path. This achieves the advantage that the switch can advantageously be switched with an applied electrical voltage, Compared to a mechanical and/or electromechanical switch, the transistor can have a longer service life and a faster switching speed.

The first switch can be formed by an electromechanical relay, which physically separates the first current path. Compared to a transistor, the advantage of an electromechanical relay can be lower contact resistance, higher insulation resistance and/or higher switch-on power.

The first switch can be formed by a semiconductor relay, which can be realised using a transistor, thyristor and/or triac. Due to the absence of mechanical components, the semiconductor relay can have a longer service life than the electromechanical relay and/or be suitable for a large number of switching operations. A semiconductor relay can, for example, switch an alternating current (AC) voltage during the zero crossing.

In one example, the UPS comprises at least one energy source, in particular a supply network connection and/or an energy storage, for supplying electrical energy to the consumer, wherein the first current path and the second current path can be connected or are connected to the energy supply, in particular by means of the first switch.

A UPS can realise a continuous supply of an electrical consumer with electrical energy. To accomplish this, the UPS can obtain electrical energy from a supply network connection and transmit it to the electrical consumer. The UPS can furthermore be configured to determine whether the energy supply of the electrical consumer is possible via the supply network connection. If an energy supply via the supply network connection is not possible, the UPS can supply the electrical consumer with electrical energy via an alternative energy source. Such an alternative energy source can be an energy storage, for example, in particular a UPS-internal energy storage. The switchover of the energy supply from the supply network connection to the energy storage can in particular be implemented without interruption.

In one example, the UPS comprises a third current path and a fourth current path, which are configured to provide the first current path and the second current path with electrical energy from the energy storage, wherein the third current path and the fourth current path are electrically connected upstream of the first current path and the second current path, wherein the energy storage is electrically connected upstream of the third current path and the fourth current path, a further voltage transformer for limiting a current intensity of an electrical current, wherein the further voltage transformer is arranged in the fourth current path, and a second switch, which is configured to close the third current path.

The further voltage transformer in the fourth current path can in particular be suitable for providing an adjusted voltage to the energy storage, in order to charge energy storage with electrical energy. This electrical energy can be provided by the supply network connection, for example. If the electrical consumer is not supplied with electrical energy through the energy storage, the energy storage can be charged with electrical energy through the supply network connection. The third current path can be open during charging of the energy storage by the second switch, so that no electrical current can flow via the third current path. The energy storage can be configured to simultaneously be charged with electrical energy via the supply network connection and supply the electrical consumer with electrical energy.

In order to supply the electrical consumer with electrical energy from the energy storage, the third current path can be closed by the second switch, so that an electrical current can flow via the third current path. This achieves the advantage that the supply of the electrical consumer with electrical energy does not take place via the fourth current path with the further voltage transformer, so that electrical power losses that can occur in the voltage transformer can advantageously be reduced.

The further voltage transformer can be controlled by the controller in such a way that the charging of the energy storage with electrical energy takes place in a manner that is advantageous, in particular gentle to the energy storage. This achieves the advantage that the service life of the energy storage can be extended and/or the storage capacity of the energy storage can be preserved.

In one example, the further voltage transformer is electrically arranged in parallel to the second switch.

If the second switch is closed, an electrical current can flow from the energy storage to the electrical consumer via the first switch and/or the voltage transformer. This achieves the advantage that a supply of the electrical consumer with electrical energy can take place without further electrical components, in particular without the voltage transformer and/or the further voltage transformer. As a result, losses in the transmission of electrical energy via the UPS can advantageously be reduced.

If the second switch is open, the further voltage transformer, which is electrically arranged in parallel, can have a lower electrical resistance than the open second switch, so that an electrical current can flow from the supply network connection to the energy storage via the further voltage transformer. This achieves the advantage that the electrical current or the electrical voltage, which can be made available to the energy storage via the supply network connection, can be modified by the further voltage transformer. In particular the electrical current intensity and/or the amount of electrical voltage of the electrical energy transmitted to the energy storage can be adjusted.

In one example, when a discharge limit value of the electrical energy of the energy storage is reached, the controller is configured to control the further voltage transformer in order to supply the energy storage with electrical energy via the further voltage transformer.

The discharge limit value can, for example, be determined by the output voltage of the energy storage. The controller can control the charging of the energy storage to maximise the electrical energy for the supply of the electrical consumer stored in the energy storage and/or to preserve the energy storage capacity of the energy storage.

In one example, the controller is configured to close the second switch, in order to conduct electrical current to the electrical consumer via the third current path.

By closing the second switch, electrical energy can be transported from the energy storage to the first and/or second current path and transported to the electrical consumer via the first and/or second current path.

In one example, the UPS comprises a third switch, which is electrically connected upstream of the current paths in order to switchably connect the current paths with an energy source.

The third switch can be configured to connect the supply network connection with the current paths. The third switch can in particular be permanently electrically connected to the voltage transformer and/or the further voltage transformer. In one switch position, the third switch can electrically separate the current paths from the supply network connection, whereby the electrical consumer can be supplied with electrical energy from the energy storage.

In one example, the UPS further comprises a current measurement device for measuring the current intensity of the electrical current.

A measured value of the current intensity of the electrical current, which can be recorded by the current measurement device, can be provided to the controller. The controller can be configured to compare this measured value with a current intensity limit value and, in particular when the measured value exceeds the current intensity limit value, control the first switch and/or the voltage transformer in order to reduce the current intensity of the electrical current. This can be accomplished by opening the first switch, so that electrical energy is transported from an energy source via the voltage transformer, which can advantageously reduce the current intensity of the electrical current. As a result, continuous operation of the UPS can be realised, because the current intensity limit value is not lastingly exceeded.

In one example, the current measurement device is electrically connected downstream or upstream of the first switch.

The current measurement device can advantageously be integrated into a current path that is involved in the energy supply of the electrical consumer with electrical energy in every operating state of the UPS. The current measurement device can be electrically connected in series with the first, second, third, and/or fourth current path.

BRIEF DESCRIPTION OF THE DRAWINGS

Further examples of the principles of the present disclosure will be explained with reference to the accompanying figures.

DETAILED DESCRIPTION

Figure 1:
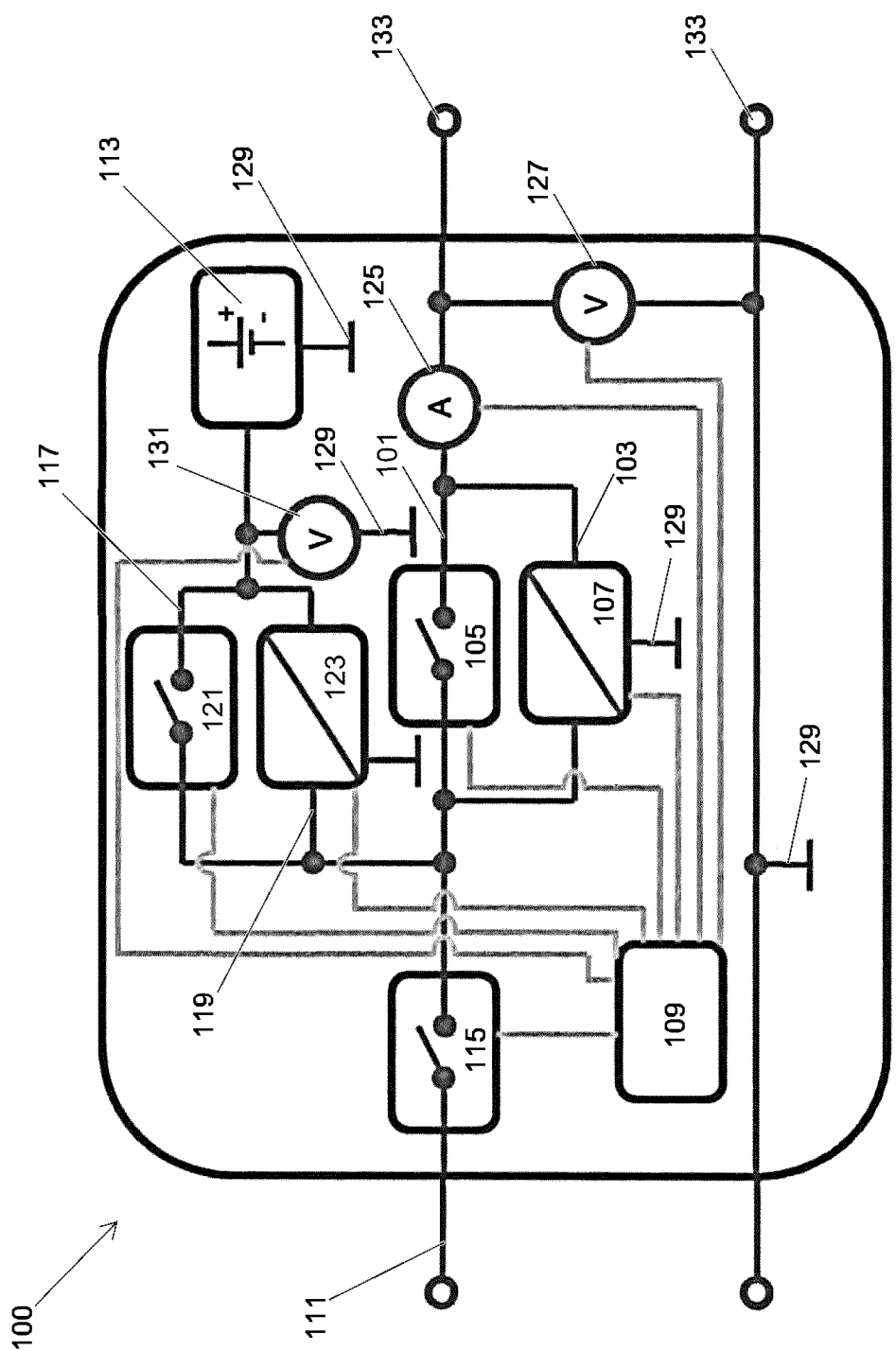
FIG. 1 shows an uninterruptible power supply according to an example.

FIG. 1 shows a schematic illustration of the UPS 100 for an electrical consumer, comprising a first current path 101 and a second current path 103, which are configured to supply the electrical consumer with electrical energy, a first switch 105, which is configured to interrupt the first current path 101, a voltage transformer 107 for limiting a current intensity of an electrical current, wherein the voltage transformer 107 is arranged in the second current path 103, and a controller 109, which is configured to open the first switch 105 when a current intensity limit value of the electrical current in the first current path 101 is reached in order to electrically interrupt the first current path 101 and conduct the electrical current over the voltage transformer 107 in order to limit the current.

A first functional group consisting of the voltage transformer 107, the first switch 105, the current measurement device 125, the first current path 101, the second current path 103, and a voltmeter 127 can be configured for supplying the electrical consumer with electrical energy. In a first switch position of the first switch 105, the supply of the electrical consumer with electrical energy can occur via the first switch 105 and the first current path 101 and, in a second switch position of the first switch 105, via the voltage transformer 107 and the second current path 103. The current measurement device 125 is configured to measure the electrical current supplied to the electrical consumer and the voltmeter 127 is configured to measure the electrical voltage supplied to the electrical consumer. The current intensity measured value from the current measurement device 125 and the voltage measured value from the voltmeter 127 can be provided to the controller 109, so that information about the electrical power made available to the electrical consumer can be provided to the controller 109. This first functional group can be connected to an energy source, in particular a supply network connection 111, via the third switch 115.

The supply of the electrical consumer with electrical energy through the supply network connection 111 can be supplemented by a second functional group, which comprises the second switch 121, the further voltage transformer 123, the third current path 117, the fourth current path 119, a further voltmeter 131 and the energy storage 113. If the electrical connection to the supply network connection 111, in particular via the third switch 115 in an open position, is interrupted, the electrical consumer can be supplied with electrical energy that is stored in the energy storage 113. The second switch can be closed, so that an electrical connection between the energy storage 113 and the electrical consumer via the third current path and the first and/or second current path can be realised.

All the elements of the UPS 100, excluding the energy storage 113 and the supply network connection 111, can be controlled by the controller 109 and are electrically connected to said controller via control lines.

The electrical connection to the electrical consumer can be formed by two electrical contacts 133, whereby one of the two electrical contacts 133 can have a ground potential. The connections with electrical reference potential 129 and one of the two electrical contacts 133 have a common ground potential. The voltmeter 119 and the further voltmeter 131 measure an electrical voltage in relation to the previously mentioned ground potential. The electrical voltage of the supply network connection 111 is likewise related to said ground potential.

The first, second, and third switch 105, 121, 115 can block, so that the electrical connection is interrupted via the respective switch 105, 121, 115 and no electrical current can flow through the respective switch 105, 121, 115. The first, second, and third switch 105, 121, 115 can be connected, so that an electrical connection via the respective switch 105, 121, 115 is possible and an electrical current can flow through the respective switch 105, 121, 115.

The voltage transformer 107 and/or the further voltage transformer 123 can have an active state in which an electrical current flows through the respective voltage transformer 107, 123. Current intensity and voltage of the electrical energy transported by the respective voltage transformer 107, 123 can be controllable by the controller 109.

The voltage transformer 107 and/or the further voltage transformer 123 can have an inactive state in which no electrical current flows through the respective voltage transformer 107, 123. The controller 109 can be configured to switch the state of the respective voltage transformer 107, 123 between active and passive.

The energy storage 113 can be charged, in particular fully charged, if the further voltmeter 131 measures a voltage value that lies above a charging voltage limit value of the energy storage 113. The amount of electrical energy stored in the energy storage can be proportional to the electrical voltage dropping over the energy storage 113. The energy storage 113 can be charged with electrical energy, if the further voltmeter 131 measures a voltage value that lies below a charging voltage limit value of the energy storage 113.

A current intensity of an electrical current can be greater than the current intensity limit value, so that an overcurrent flows. This overcurrent can in particular be recorded by the current measurement device 125.

According to the features of the UPS 100 shown in FIG. 1, the following operating modes of the UPS 100 are possible:

During an activation process of the UPS 100, the third switch 115 can be connected, the first switch 105 can interrupt the electrical current flow via the first current path 101 and the second switch 121 can interrupt the current flow via the fourth current path 117. The voltage transformer 107 can limit an electrical starting current and can be controlled by the control unit 109. The further voltage transformer 123 is inactive.

A mains operation of the UPS 100 is characterised in that the UPS 100 is supplied with electrical energy from a supply network via the supply network connection 111.

During mains operation, the energy storage 113 can be fully charged and the current measurement device 125 does not record an overcurrent. The first switch 105 and the third switch 115 can be connected and the second switch 121 can block. Both the voltage transformer 107 and the further voltage transformer 123 can be inactive.

During mains operation, the UPS-internal energy storage 113 can be fully charged and an overcurrent is recorded by the current measurement device 125. The third switch 115 can be connected and the first switch 105 and the second switch 121 can block. The further voltage transformer 123 can be inactive. The voltage transformer 107 is controlled by the control unit 109 and can transport electrical energy from the supply network connection 111 to the electrical consumer. The voltage transformer 107 is controlled by control unit 109 such that the electrical current flowing to the electrical consumer can be limited.

During mains operation, the energy storage 113 can be charged and no overcurrent is recorded by the current measurement device 125. The third switch 115 and the first switch 105 can be connected and the second switch 121 can block. The voltage transformer 107 can be inactive. The further voltage transformer 123 is controlled by the control unit 109 such that the energy storage 113 is supplied with electrical energy via the supply network connection 111, so that the energy storage 113 can be electrically charged.

During mains operation, the energy storage 113 can be charged and an overcurrent is recorded by the current measurement device 125. The third switch 115 can be connected and the first switch 105 and the second switch 121 can block. The voltage transformer 107 is active and can transport electrical energy from the supply network connection 111 to the electrical consumer, whereby the voltage transformer 107 is controlled by the control unit 109, so that the electrical current flowing through the voltage transformer 107 can be controlled, in particular limited. The further voltage transformer 123 can be active, is controlled by the control unit 109 and can transport electrical energy from the supply network connection 111 to the energy storage 113.

A UPS operation of the UPS 100 is characterised in that the UPS 100 supplies an electrical consumer with electrical energy from the energy storage 113. A change from mains operation to UPS operation is controlled by the control unit 109 and can, for example, take place if no electrical energy is supplied to the UPS 100 via the supply network connection 111.

During UPS operation, no overcurrent is recorded by the current measurement device 125. The first switch 105 and the second switch 121 can be connected and the third switch 115 can block. The voltage transformer 107 and the further voltage transformer 123 are inactive. As a result, the energy storage 113 can transport electrical energy to the electrical consumer.

During UPS operation, an overcurrent is recorded by the current measurement device 125. The second switch 121 can be connected and the first switch 105 and the third switch 115 can block. The further DC voltage transformer 123 is inactive. The voltage transformer 107 is active and can transport electrical energy from the energy storage 113 to the electrical consumer, whereby the voltage transformer 107 is controlled by the controller 109, in particular controlled such that the current intensity of an electrical current that flows to the consumer can be limited by the voltage transformer 107.

Figure 2:
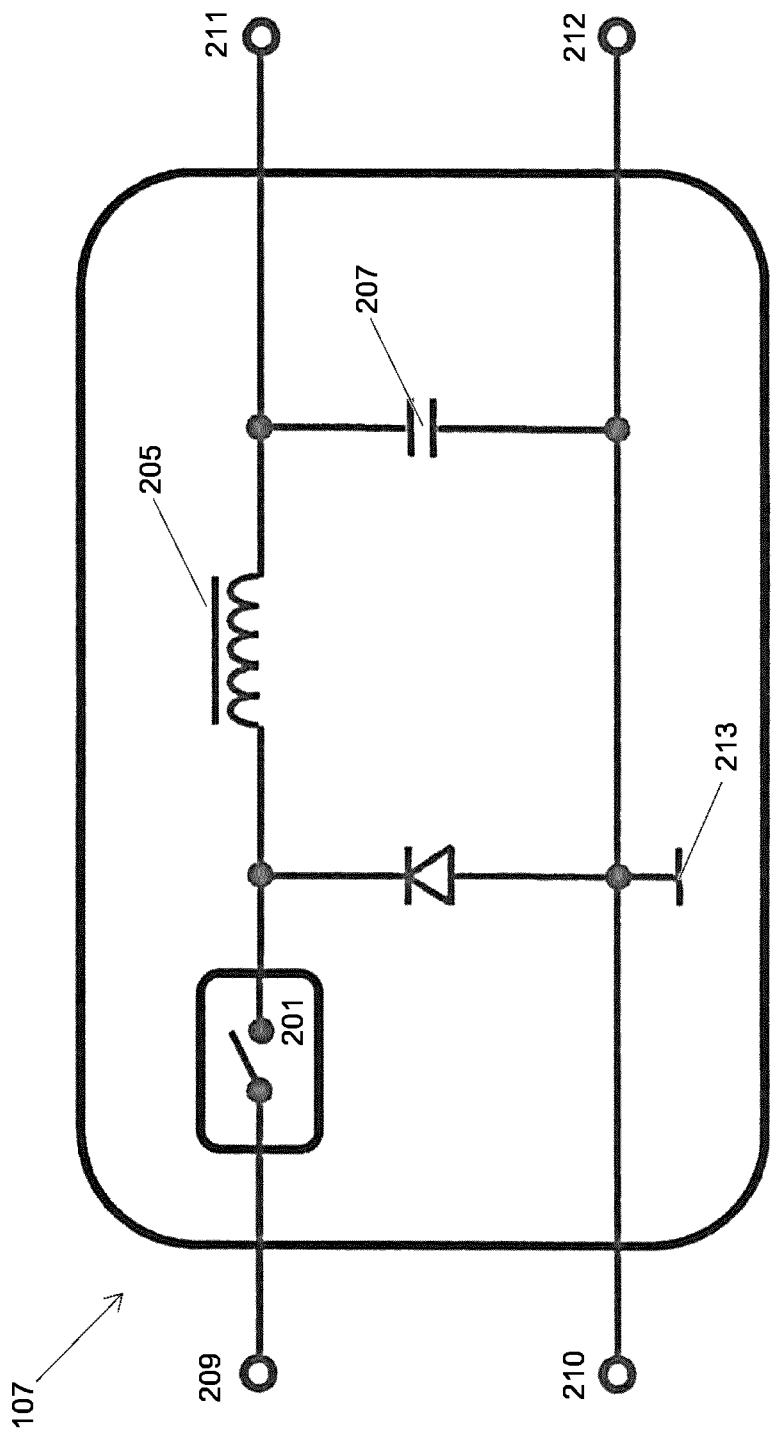
FIG. 2 shows a voltage transformer according to an example.

FIG. 2 shows a schematic illustration of the voltage transformer 107, which can be formed by a transformer switch 201, a diode 203, an electromagnetic coil 205 and a capacitor 207. The voltage transformer 107 furthermore comprises two input contacts 209, 210, and two output contacts 211, 212 and an electrical connection with reference potential 213.

The example shown in FIG. 2 realises a step-down converter configured for DC voltage, which can provide the electrical consumer with an electrical voltage that is lower than an electric voltage provided to the step-down converter by the supply network connection 111 or the energy storage 113. Due to the lower electrical voltage, the current intensity of the electrical current flowing through the electrical consumer can be limited as well.

LIST OF REFERENCE NUMBERS

100 Uninterruptible power supply (UPS)
101 First current path

103 Second current path
105 First switch
107 Voltage transformer
109 Controller
111 Supply network connection
113 Energy storage
115 Third switch
117 Third current path
119 Fourth current path
121 Second switch
123 Voltage transformer
125 Current measurement device
127 Voltmeter
129 Connection with electrical reference potential
131 Further voltmeter
133 Electrical contact
201 Transformer switch
203 Diode
205 Electromagnetic coil
207 Capacitor
209 Input contact
210 Input contact
211 Output contact
212 Output contact
213 Connection with electrical reference potential

What is claimed is:

1. An uninterruptible power supply for an electrical consumer, comprising:
   a first current path;
   a second current path, wherein the first current path and the second current path are configured to supply electrical energy;
   a first switch configured to interrupt the first current path;
   a first voltage transformer configured to limit a current intensity of an electrical current, wherein the first voltage transformer is in the second current path;
   a controller configured to open the first switch when a current intensity limit value of the electrical current in the first current path is reached to electrically interrupt the first current path and conduct the electrical current over the first voltage transformer to limit the electrical current; and
   at least one energy source configured to supply the electrical energy, wherein the first current path and the second current path are connected to the at least one energy source, and wherein the at least one energy source is an energy storage that comprises:
      a third current path and a fourth current path that are switched in parallel to one another and are configured to connect the first current path and the second current path with the energy storage, wherein the third current path and the fourth current path are electrically connected with the first current path and the second current path, wherein the energy storage is electrically connected to the third current path and the fourth current path,
      a second voltage transformer configured to limit the current intensity of the electrical current, wherein the second voltage transformer is in the fourth current path, and
      a second switch configured to close or open the third current path, wherein the controller is configured to close the second switch to connect the electrical consumer with the energy storage.

2. The uninterruptible power supply according to claim 1, wherein the first switch is in the first current path.

3. The uninterruptible power supply according to claim 1, wherein the first current path and the second current path are connected in parallel.

4. The uninterruptible power supply according to claim 1, wherein the controller is configured to close the first switch when the current intensity is below the current intensity limit value to incorporate the first current path in the electrical energy supply.

5. The uninterruptible power supply according to claim 1, wherein the first voltage transformer is a direct current (DC) voltage transformer.

6. The uninterruptible power supply according to claim 1, wherein the first voltage transformer is a step-down converter for voltage reduction.

7. The uninterruptible power supply according to claim 1, wherein the first switch is electrically arranged in parallel to the first voltage transformer.

8. The uninterruptible power supply according to claim 1, wherein the first switch comprises one or more metal-oxide-semiconductor field-effect transistors (MOSFET) or at least one relay.

9. The uninterruptible power supply according to claim 1, wherein the second voltage transformer is electrically arranged in parallel to the second switch.

10. The uninterruptible power supply according to claim 1, wherein the controller is configured to actuate the second voltage transformer when a discharge limit value of the energy storage is reached to supply the energy storage with electrical energy via the second voltage transformer.

11. The uninterruptible power supply according to claim 1, wherein the controller is configured to close the second switch to conduct the electrical current to the electrical consumer via the third current path.

12. The uninterruptible power supply according to claim 1, further comprising:
   a third switch that is electrically connected upstream of the first, the second, the third, and the fourth current path to switchably connect the first, second, third, and fourth current paths with the at least one energy source.

13. The uninterruptible power supply according to claim 1, further comprising:
   a current measurement device configured to measure the current intensity of the electrical current.

14. The uninterruptible power supply according to claim 13, wherein the current measurement device is electrically connected downstream or upstream of the first switch.

15. The uninterruptible power supply according to claim 1, wherein the at least one energy source is a supply network connection.

16. The uninterruptible power supply according to claim 1, wherein the first current path and the second current path are connected to the at least one energy source via the first switch.

17. The uninterruptible power supply according to claim 1, wherein the third current path and the fourth current path are upstream of the first current path and the second current path.

18. The uninterruptible power supply according to claim 12, wherein the at least one energy source is a supply connection.

* * * * *